United States Patent
Yperen et al.

[11] Patent Number: 6,103,660
[45] Date of Patent: Aug. 15, 2000

[54] METHOD OF DEPOSITING CATALYTICALLY ACTIVE COMPONENTS ON HIGH-SURFACE AREA SUPPORT MATERIALS

[75] Inventors: Renee Van Yperen, Loenen a/d Vecht, Netherlands; Dieter Lindner, Hanau, Germany; Lothar Mussmann, Offenbach, Germany; Egbert Lox, Hanau, Germany; Thomas Kreuzer, Karben, Germany

[73] Assignee: Degussa Hüls Aktiengesellschaft, Frankfurt, Germany

[21] Appl. No.: 09/055,908

[22] Filed: Apr. 7, 1998

[30] Foreign Application Priority Data

Apr. 9, 1997 [DE] Germany .............. 197 14 732

[51] Int. Cl.$^7$ ............................ B01J 23/40
[52] U.S. Cl. ............ 502/327; 502/325; 502/326; 423/213.2; 423/213.5; 423/625; 423/628
[58] Field of Search ................. 502/232, 234, 502/245, 257, 258, 261, 300, 325, 326, 327; 423/625, 628, 213.2, 213.5

[56] References Cited

U.S. PATENT DOCUMENTS

| | | | |
|---|---|---|---|
| 3,899,444 | 8/1975 | Stephens | 252/455 R |
| 3,928,239 | 12/1975 | Yonehara et al. | 252/466 PT |
| 4,021,185 | 5/1977 | Hindin et al. | 431/7 |
| 4,048,096 | 9/1977 | Bissot | 252/430 |
| 4,081,406 | 3/1978 | Sawyer | 252/455 R |
| 4,162,235 | 7/1979 | Acres et al. | 252/462 |
| 4,172,047 | 10/1979 | Gandhi et al. | 252/466 PT |
| 4,237,032 | 12/1980 | Evans et al. | 252/462 |
| 4,331,565 | 5/1982 | Schaefer et al. | 252/462 |
| 4,442,223 | 4/1984 | Chester et al. | 502/68 |
| 4,504,598 | 3/1985 | Ono et al. | 502/303 |
| 4,619,909 | 10/1986 | Ono et al. | 502/303 |
| 4,624,940 | 11/1986 | Wan et al. | 502/251 |
| 4,650,782 | 3/1987 | Onal | 502/339 |
| 4,678,770 | 7/1987 | Wan et al. | 502/304 |
| 4,748,145 | 5/1988 | Wood et al. | 502/332 |
| 4,839,327 | 6/1989 | Haruta et al. | 502/243 |
| 4,902,661 | 2/1990 | Immel et al. | 502/184 |
| 4,904,633 | 2/1990 | Ohata et al. | 502/304 |
| 4,906,176 | 3/1990 | Yamashita et al. | 431/7 |
| 5,015,617 | 5/1991 | Ohata et al. | 502/304 |
| 5,166,415 | 11/1992 | Doumaux, Jr. et al. | 564/480 |
| 5,397,758 | 3/1995 | Bouruetaubertot et al. | 502/303 |
| 5,413,984 | 5/1995 | Marecot et al. | 502/333 |
| 5,474,965 | 12/1995 | Nakatsuji et al. | 502/330 |
| 5,491,120 | 2/1996 | Voss et al. | 502/304 |
| 5,676,912 | 10/1997 | Sharma et al. | 423/213.2 |

FOREIGN PATENT DOCUMENTS

| | | |
|---|---|---|
| 0399203A2 | 11/1990 | European Pat. Off. |
| 0658375A1 | 11/1994 | European Pat. Off. |
| 19547598 | 8/1997 | Germany. |
| 1294055A | 10/1972 | United Kingdom. |

OTHER PUBLICATIONS

"Production of Supported Copper and Nickel Catalysts by Deposition–Precipitation", Van Dillen et al., 6th Int. Conf. On Cat 1976, pp. 667–685, XP002074891.

*Primary Examiner*—Tom Dunn
*Assistant Examiner*—Cam N. Nguyen
*Attorney, Agent, or Firm*—Smith Gambrell & Russell, LLP

[57] ABSTRACT

A method of depositing catalytically active components on high-surface carrier materials is disclosed by dispersing the carrier materials in water and mixing this dispersion with an aqueous solution of soluble precursors of the catalytically active components. The pH of the dispersion is adjusted to a value between 6 and 8 before the aqueous solution of the precursors is supplied by capillary injection under constant agitation of the dispersion and thereafter, if necessary, the precursors of the catalytically active components are precipitated on the carrier material by capillary injection of a dilute base.

10 Claims, 1 Drawing Sheet

METHOD OF DEPOSITING CATALYTICALLY ACTIVE COMPONENTS ON HIGH-SURFACE AREA SUPPORT MATERIALS

The present invention is relates to a method of depositing catalytically active components on high-surface area support materials by dispersing the support materials in water and mixing this resulting dispersion with an aqueous solution of soluble precursors of the catalytically active components.

So-called supported catalysts are used in catalysis, especially in the catalytic purification of the exhaust gases of internal combustion engines. In the case of these catalysts the actual catalytically active components are applied in highly dispersed form on support materials in order to assure a high catalytic activity with the smallest possible amounts of active components. To this end support materials are used which have a large specific surface area to receive the catalytically active components. This usually involves powdery, temperature-stable metallic oxides.

In the case of automobile exhaust gas catalysts the support materials are applied in the form of a coating on catalytically inert carrier bodies. Suitable carrier bodies for the purification of automobile exhaust gases are so-called honeycomb bodies of ceramic or metal which have parallel flow conduits for the exhaust gas to pass through. In order to coat the honeycomb bodies with the support materials the support materials are usually dispersed in water and customarily homogenized by a grinding process. The average particle size of the support materials is adjusted by the grinding to a value between 1 and 10 μm. The walls of the flow channels are coated by dipping the honeycomb bodies once or repeatedly into this coating dispersion with subsequent drying and calcining. The finished coating is also designated as a dispersion coating.

In this method of procedure the catalytically active components can be applied at various points in time onto the specific surface of the support materials. It is known, for example, that the catalytically active components can be deposited onto the support materials after the coating of the honeycomb bodies with the dispersion coating by dipping the coated honeycomb bodies into an aqueous solution of soluble precursors of the catalytically active components. Alternatively, there is the possibility of depositing the catalytically active components onto the powdery support materials in a process step prior to the making of the dispersion coating.

The present invention is concerned with this second possibility of depositing the catalytically active components. In order to achieve a high catalytic activity the type of deposition must assure the most finely dispersed deposition of the components possible on the specific surface of the support materials. In addition, the type of deposition should also result in a high temperature stability and aging stability of the finished catalyst, that is, the particles of the catalytically active components must be well fixed to the surface of the support materials in order to prevent a coalescence of adjacent particles when the catalyst is subjected to temperature loads.

Various methods are known for the depositing of the catalytically active components onto the powdery support materials. They include, e.g., the impregnation with an excess of impregnating solution. In this an aqueous solution of the catalytically support components whose volume can be considerably greater than the water absorption capacity of the support material is added to the powdery carrier material. The result is a mass with pulpy consistency which is dewatered e.g. in a furnace at elevated temperatures of 80 to 150° C. During the dewatering of this mass chromatographic effects can occur which can result in an uneven distribution of the catalytically active components on the support material.

In the so-called pore volume impregnation an amount of solvent corresponding to approximately 70 to 100% of the absorption capacity of the support material for this solvent is used for the solution of the catalytically active components. This usually involves water. This solution is distributed as uniformly as possible, e.g. by spraying, over the support material rotated in a vessel. After distribution of the entire solution over the support material the latter is still pourable in spite of the water content. Chromatographic effects can be largely avoided with pore volume impregnation. As a rule, it yields better results than the method, described above, of impregnating with an excess of solvent.

Van Dillen et al. (Proc. $6^{th}$ Int. Conf. on Cat., London, ed. G. C. Bond, P. B. Wells, F. C. Tomkins, 2667 (1976)) describe a method of producing copper and nickel catalysts on high-surface area support materials which can be designated as a homogeneous precipitation method. In this method the support material together with a precursor of the active component is dispersed in water. The active component is deposited on the surface of the support material by the injection of a basic or acidic solution into the dispersion with the aid of a capillary (capillary injection). In order to avoid a rapid precipitation of the active components in the solution itself the precipitation must be carried out at only slight supersaturations of the entire dispersion. In order to assure a homogeneous precipitation in the entire solution at the same time the basic or acidic solution must be supplied in slight amounts per unit of time and distributed in the dispersion uniformly by agitating the latter.

SUMMARY OF THE INVENTION

An object of the present invention is to improve the homogeneous precipitation of catalytically active noble metals of the platinum group of the Periodic Table on high-surface area support materials for applications in the purification of automobile exhaust gases.

In attaining the above and other objects, one feature of the present invention is a method for depositing catalytically active components on high-surface area support materials by dispersing the support materials in water and mixing this dispersion with an aqueous solution of soluble precursors of the catalytically active components. An important aspect of the method of this invention is that the pH of the dispersion is adjusted to a value between 6 and 8 before the aqueous solution of the precursors is supplied by capillary injection under constant agitation of the dispersion and that thereafter, if necessary, the precursors of the catalytically active components are precipitated on the support material by capillary injection of a dilute base.

BRIEF DESCRIPTION OF DRAWINGS

The present invention will be further understood with reference to the drawing wherein.

DETAILED DESCRIPTION OF INVENTION

Figure 1:
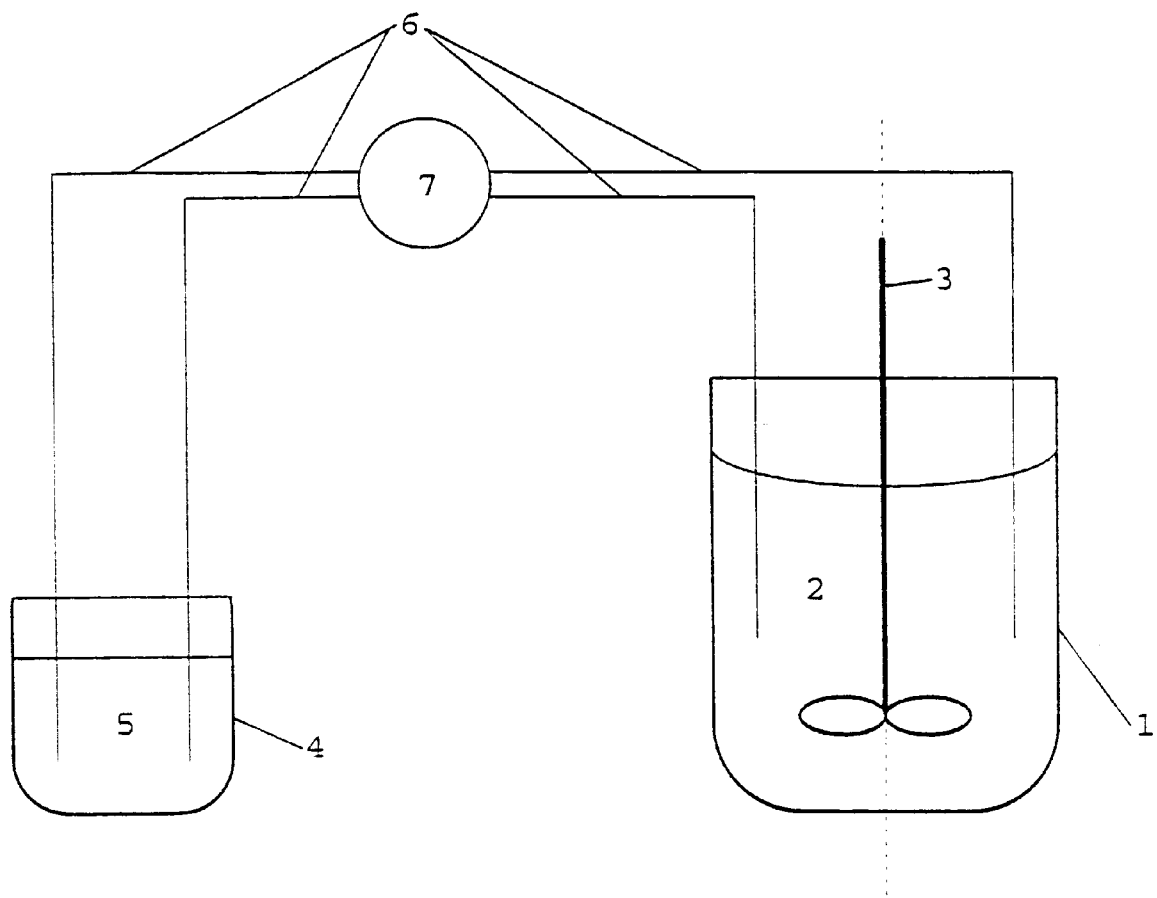
FIG. 1 is a schematic representation of an apparatus for carrying out the present invention.

The present invention will now be described in further detail.

The solution of the soluble precursors of the catalytically active components is injected into the aqueous dispersion of the support materials with the aid of one or several capillaries under the surface of the aqueous support dispersion and is rapidly distributed with the aid of an agitator over the entire dispersion volume. The rate of injection of the precursor solution is selected so that the most rapid and homogeneous distribution possible of the dissolved precursors of the catalytically active components takes place in the dispersion. A certain adsorption of the precursor compounds on the specific surface of the support material and therewith the formation of crystallization nuclei can already occur in this way. The extent of this adsorption is a function of the material combination of the support material/catalytically active components and can easily result in certain cases in an almost total adsorption of the catalytically active components. In these instances the addition of a base for the precipitation of the catalytically active components in the form of their hydroxides can be eliminated.

In the case of material combinations which do not assure a sufficient adsorption of the precursors on the support material or if a chemical fixing of the catalytically active components on the support material is desired the catalytically active components can be precipitated on the support material by capillary injection of a base, preferably of a dilute ammonia solution. During the injection of the base the rate of injection and the agitating speed must be selected in such a manner that a precipitation is avoided in the aqueous phase of the dispersion and only a precipitation on the crystallization nuclei on the support material takes place.

The resulting dispersion can be directly further processed to a coating dispersion. Alternatively, however, the dispersion can first be filtered off, dried in a drying oven and optionally calcined subsequently before the calcined material is dispersed again and homogenized by grinding for making the coating dispersion. With the method either all components of the later coating dispersion can be simultaneously coated with the catalytically active components or also only individual, selected components.

FIG. 1 shows a possible apparatus for carrying out the method in accordance with the invention. Aqueous dispersion 2 of the support material or materials is prepared in container 1. A prepared solution of the precursors or precursor compounds 5 of the catalytically active components is injected from receiver container 4 with one or several capillary tubes 6 (inside diameter approximately 1 mm) under the surface of dispersion 2. The dispersion is constantly agitated at the same time with the aid of agitator 3. A hose pump 7 is also provided. Thereafter, a dilute ammonia solution can be injected from another receiver container (not shown here) in an entirely analogous manner into the now-present mixture of dispersion and solution of the precursors in order to precipitate the catalytically active components on the support material by raising the pH of the mixture.

The apparatus shown here is suitable for small material batches and was also used in this form for the following example. However, the homogeneous precipitation method can also be carried out continuously in that the dispersion of the support material is conducted in a continuous current through an agitating or grinding unit. For the homogeneous mixing in of the precursor compounds and of the ammonia solution two such units can be connected in series. The solution of the precursor compounds and the ammonia solution are purposefully injected directly into the agitator unit or grinding unit.

EXAMPLE

An automobile exhaust catalyst containing only palladium was produced using the method in accordance with the invention. The following materials were used for this:

$La/Al_2O_3$: γ-aluminum oxide, stabilized with 2 to 4% by weight lanthanum, calculated as lanthanum oxide;
BET surface: 140 $m^2/g$;
initial particle size: $d_{50} \approx 15$ μm;

$CeO_2/ZrO_2$: Co-precipitated cerium/zirconium mixed oxide;
zirconium oxide content: 30% by weight;
BET surface: 60 $m^2/g$;
initial particle size: $d_{50} \approx 30$ μm;

$Ce(C_2H_3O_2)$: Cerium acetate
$ZrO(C_2H_3O_2)_2$: Zirconyl acetate
$Ba(C_2H_3O_2)_2$: Barium acetate
$Pd(NO_3)_3$: Palladium nitrate
Carrier body: Honeycomb body of cordierite with 62 channels per square centimeter cross-sectional surface:
dimensions: 3.8 cm diameter; 15.2 cm length
cell density: 62 $cm^{-2}$
wall thickness: 0.17 mm In order to coat the carrier body a coating dispersion was prepared containing per 1000 g stabilized aluminum oxide, 300 g cerium/zirconium mixed oxide, 300 g cerium oxide as cerium acetate, 300 g zirconium oxide as zirconyl acetate and 200 g barium oxide as barium acetate. The finished coating dispersion had a solid content of 45% by weight.

The previously prepared palladium nitrate solution with a palladium content of 0.05% by weight was injected into the dispersion at a rate of 16 ml/min with the aid of two capillary tubes under the surface of the rapidly agitated dispersion. After an agitating time of 24 hours the honeycomb body was coated by dipping it into the dispersion, dried at 120° C. in air and then calcined 2 hours at 600° C. The finished catalyst contained approximately 210 g catalytic material per liter honeycomb-body volume. Its palladium content was 3.5 g/l honeycomb-body volume.

In a use test the catalyst exhibited distinctly improved conversion rates, especially for carbon monoxide and nitrogen oxides, in comparison to a conventionally produced catalyst.

Further variations and modifications of the foregoing will be apparent to those skilled in the art and are intended to be encompasses by the claims appended hereto.

German priority application 197 14 732.1 is relied on and incorporated herein by reference.

We claim:

1. A method of depositing a catalytically active component on a high-surface area support comprising dispersing said support in water to form an aqueous dispersion, adjusting the pH of said aqueous dispersion to a pH of 6 to 8 and thereafter introducing an aqueous solution of a soluble precursor of said catalytically active component by capillary injection under constant agitation into the entire volume of the dispersion, and optionally adding a dilute base by capillary injection, to thereby precipitate said precursor of the catalytically active component on the support.

2. The method according to claim 1 wherein the catalytically active component is a member selected from the platinum group of the Periodic Table.

3. The method according to claim 1 wherein the base is ammonia solution.

4. The method according to claim 1 wherein said support has a BET surface area of at least 100 $m^2/g$.

5. The method according to claim 1 wherein the support is γ-aluminum oxide.

6. The method according to claim 1 wherein said dispersion contains finely divided γ-aluminum oxide stabilized with lanthanum, coprecipitated cerium/zirconium mixed oxide, cerium acetate, zirconyl acetate, and barium acetate.

7. The method of making an automotive exhaust gas purification catalyst comprising dipping a honeycomb into a dispersion made according to claim 1, drying and calcining.

8. An automotive exhaust gas purification catalyst produced by the method of claim 7.

9. The method of depositing a catalytically active component on a high-surface area powdery support material according to claim 1, wherein an average particle size of said powdery support material is between 1 and 10 $\mu$m.

10. The method of depositing a catalytically active component on a high-surface area powdery support material according to claim 1, wherein a $d_{50}$ value of said powdery support material is between about 15 and about 30 $\mu$m.

* * * * *